R. C. OSGOOD.
TRUCK DRIVING MECHANISM.
APPLICATION FILED JULY 16, 1919.

1,364,052.

Patented Dec. 28, 1920.

Inventor
Robert C. Osgood.
by
Horace L. ?
Atty.

UNITED STATES PATENT OFFICE.

ROBERT C. OSGOOD, OF CLAREMONT, NEW HAMPSHIRE, ASSIGNOR TO SULLIVAN MACHINERY COMPANY, A CORPORATION OF MASSACHUSETTS.

TRUCK-DRIVING MECHANISM.

1,364,052.  Specification of Letters Patent.  Patented Dec. 28, 1920.

Application filed July 16, 1919. Serial No. 311,323.

*To all whom it may concern:*

Be it known that I, ROBERT C. OSGOOD, a citizen of the United States, residing at Claremont, in the county of Sullivan and State of New Hampshire, have invented certain new and useful Improvements in Truck-Driving Mechanism, of which the following is a full, clear, and exact specification.

My invention relates to truck driving mechanism.

It has for its object to provide an improved truck driving mechanism especially adapted to use in those connections wherein the power for driving the truck is derived from a power or motor element carried on the truck. A further object of my invention is to provide an improved truck driving mechanism especially adapted to use in connection with a mining machine truck whereby it is possible to render the truck driving gearing more efficient for a given size and more compact and cheap for a given efficiency. These and other objects and advantages of my improved construction will, however, hereinafter more fully appear.

In the accompanying drawings I have shown for purposes of illustration one embodiment which my invention may assume in practice.

In these drawings,—

Figure 1:
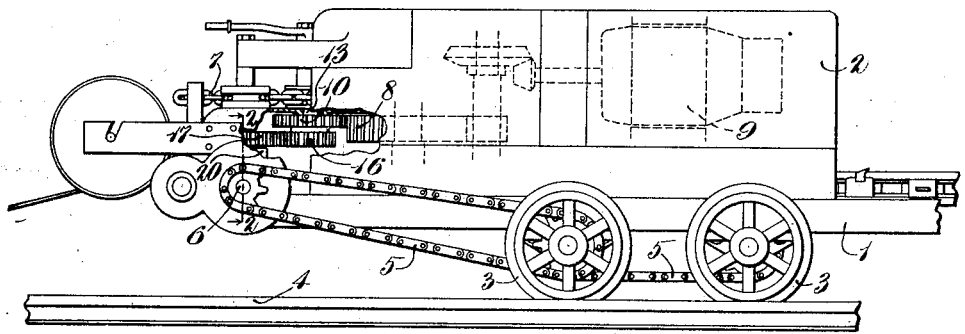
Figure 1 is a side elevation of one form of mechanism equipped with my improvement, both the truck and mining machine being shown therein and partially broken away to facilitate illustration.
Figure 2:
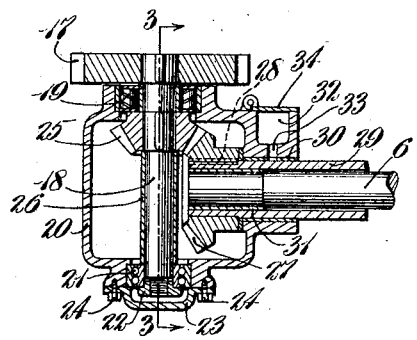
Fig. 2 is a partial vertical transverse sectional view of the truck driving mechanism, the view being taken substantially on line 2—2 of Fig. 1.
Figure 3:
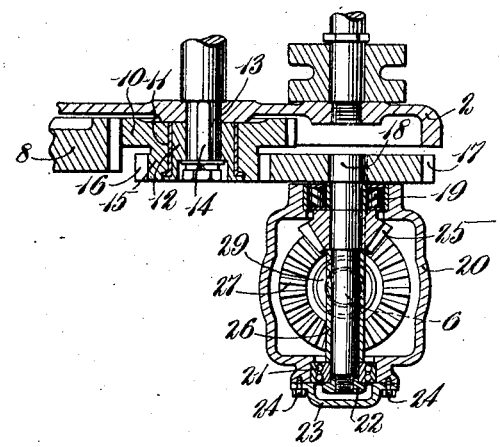
Fig. 3 is a sectional view taken on line 3—3 of Fig. 2, showing the truck driving mechanism and its connected driving mechanism on the machine.

In this illustrative construction I have shown a mining machine truck 1 of standard construction adapted to transport a mining machine 2, and mounted on wheels 3 movable over the usual mine track 4, the wheels 3 being propelled through usual sprocket and chain connections 5 from a transverse power shaft 6 carried at the rear end of the truck, it being understood that the machine 2 is, as usual, slidable over the truck body into operative connection with the truck driving mechanism when moved in one direction on the truck under the influence of its feed chain 7, and is slidable out of operative connection therewith when moved in the opposite direction under the influence of its feed chain, all in a well known manner.

In my improved construction it will be observed that the main gear 8 on the mining machine, which is, as usual, rotated from the mining machine motor 9, meshes with a smaller gear 10 journaled in suitable bearings 11 on a depending bearing member 12, herein attached to the frame of the mining machine, as by a stud 13 having a spline 14 engaging the frame and the member 12 and holding the latter against rotation relative to the former. This gear 10 herein is also provided with an integral lower extension 15 having gear teeth 16 and forming a reducing gear coaxially disposed with the gear 10, which herein meshes with a coöperating larger gear 17 splined to the upper end of a vertical shaft 18 carried on the truck. As shown, this shaft 18 is journaled at its upper end in suitable roller bearings 19 carried on a truck driving gear casing 20. Also, the lower end of this shaft is herein journaled in a suitable ball bearing 21 likewise carried on this casing and clamped thereon by a nut 22, the bearing 21 and nut 22 being both inclosed by a suitable cap 23 attached by screws 24, the construction being such that the cap serves to hold the bearing 21 in place and permit the removal of the elements 21 and 22 upon removal of the cap. As shown, the shaft 18 also has splined on the upper end thereof a smaller bevel gear 25 disposed adjacent the roller bearing 19 and held in proper position upon the shaft by a sleeve 26 having its lower end resting on the ball bearing ring. This bevel gear 25 in turn also meshes with a bevel gear 27 fixed, as by a spline 28, to the inner end of a sleeve 29 rotatable on the shaft 6, the sleeve being connected with the usual frictional controlling mechanism, not shown, which in turn controls the rotation of the shaft in a well known manner. As illustrated, it will also be observed that suitable bearing sleeves 30 and 31 are interposed between the members. Herein, it will also be noted that an oil chamber or cup 32 is provided in the casing 20, the same having an aperture 33 leading to the bearing 30 and a cover 34.

In the operation of my improved construction, when through the rotation of the armature of the motor 9 the main gear 8 on the machine is rotated, it will be observed that the gear 10 will be rotated, carrying with it the reduction gear 16, which will in turn rotate the gear 17 at a reduced speed. From this gear 17, it will also be observed that the rotation is conveyed through the bevel pinion 25 and the coöperating bevel pinion 27 at a further reduced speed to the two usual driving elements 29 and 6 of the truck driving mechanism, of which we need only consider the element 6 which drives the chain connections 5. In other words, it will be noted that through my improved mechanism wherein a reduction mechanism, as distinguished from a simple idler gear, is placed upon the machine, the amount of reduction which is required to be obtained by the gears between the gear 17 and the truck wheels is materially reduced in such a manner that, while the truck wheels may be driven at the desired speed, the size of the gearing necessary on the truck between the gears 17 and the wheels need not be increased proportionately.

In the use of my improved construction it will also be noted that through my improved supplemental reducing mechanism it is possible to decrease the cost of the truck by using driving mechanism on the truck comprising gearing which would otherwise be too small to be utilized with the usual idler drive on the machine, wherein a gear corresponding to the gear 10 is connected directly to a gear corresponding to the gear 17, and all the reduction takes place in the gearing between the gear 17 and the truck wheels. It will also be observed that through my improved construction it is possible to improve the action of existing truck driving mechanisms of the small size indicated and to apply my improvement to existing truck drives and machines of standard construction with only minor changes. These and other advantages of my improved construction will, however, be clearly apparent to those skilled in the art.

While I have in this application specifically described one embodiment which my invention may assume in practice, it will be understood that the same may be modified and embodied in various other forms and used with various other forms of gearing without departing from its spirit or the scope of the appended claims.

What I claim as new and desire to secure by Letters Patent is:

1. In combination, a power operated mining machine truck including a machine driven gear, a mining machine on said truck having a rotatable main gear, and reduction mechanism between said gears and carried in rear of said main gear on said mining machine.

2. In combination, a power operated mining machine truck including a machine driven gear, a mining machine movable on said truck and having a main gear, and reduction mechanism between said gears carried on a vertical axis on said machine and having one element movable into or out of mesh with said driven gear.

3. In combination, a power operated mining machine truck including a machine driven gear rotatable on a vertical axis, a mining machine on said truck having a main gear, and reduction mechanism between said gears and carried on said mining machine including a plurality of gears each meshing with one of said gears.

4. In combination, a power operated mining machine truck including a machine driven gear, a mining machine on said truck having a main gear, and reduction mechanism between said gears and carried on said mining machine including a plurality of coaxially disposed gears each rotatable on a vertical axis and meshing with one of said gears.

5. In combination, a mining machine truck including a machine driven gear rotatable on a vertical axis, a mining machine on said truck having a gear rotatable on a parallel axis, and reduction mechanism between said gears and carried on said mining machine including a plurality of gears rotatable in horizontal planes.

6. In combination, a power operated mining machine truck including a machine driven gear rotatable on a vertical axis, a mining machine on said truck having a gear rotatable on a parallel axis, and reduction mechanism between said gears and carried on said mining machine including a plurality of gears rotatable in planes parallel to the plane of one of said gears.

7. In combination, a power-operated mining machine truck including a machine driven gear and reduction gearing between the same and the wheels of said truck, a mining machine movable on said truck including a rotatable gear, and coöperating reduction gearing carried on said machine and including a plurality of elements each horizontally disposed and meshing with one of said gears.

8. In combination, a power operated mining machine truck including a machine driven gear and reduction gearing between the same and the wheels of said truck, a mining machine movable on said truck including a rotatable gear, and coöperating reduction gearing carried on said machine and including a plurality of coaxially disposed elements rotatable about an axis parallel to the axes of said gears and each meshing with one of said gears.

In testimony whereof I affix my signature.

ROBERT C. OSGOOD.